(12) United States Patent
Liu et al.

(10) Patent No.: US 12,481,701 B1
(45) Date of Patent: Nov. 25, 2025

(54) DECONSTRUCTING GRAPHS USING A DATABASE MANAGEMENT APPROACH

(71) Applicant: Microsoft Technology Licensing, LLC, Redmond, WA (US)

(72) Inventors: Ping Liu, Weston, FL (US); Jose Eduardo Corona Espinoza, San Francisco, CA (US); Priya Santosh Bannur, Sunnyvale, CA (US); Andrii Soviak, San Jose, CA (US); Qianqi Shen, Saratoga, CA (US); Jianqiang Shen, San Mateo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/919,116

(22) Filed: Oct. 17, 2024

(51) Int. Cl.
*G06F 16/2455* (2019.01)
*G06F 16/901* (2019.01)

(52) U.S. Cl.
CPC ...... *G06F 16/9024* (2019.01); *G06F 16/2456* (2019.01); *G06F 16/24565* (2019.01)

(58) Field of Classification Search
CPC ............. G06F 16/9024; G06F 16/2456; G06F 16/24565
See application file for complete search history.

(56) References Cited

U.S. PATENT DOCUMENTS

| | | | |
|---|---|---|---|
| 9,911,211 B1 * | 3/2018 | Damaraju | G06F 3/0488 |
| 11,048,696 B2 * | 6/2021 | Church | G06F 16/248 |
| 11,093,553 B2 * | 8/2021 | Potiagalov | G06F 16/9024 |
| 11,271,876 B2 * | 3/2022 | Yoon | G06F 16/903 |
| 11,574,126 B2 * | 2/2023 | McGoldrick | G06F 40/295 |
| 12,106,217 B2 * | 10/2024 | Creed | G06N 3/084 |
| 12,287,785 B2 * | 4/2025 | Vig | G06N 5/046 |
| 2015/0074044 A1 * | 3/2015 | Metreveli | G06F 16/24552 707/769 |
| 2019/0384926 A1 * | 12/2019 | Wu | G06F 21/6218 |
| 2020/0265090 A1 * | 8/2020 | Hilloulin | G06F 16/9024 |
| 2021/0056428 A1 * | 2/2021 | Palowitch | G06F 17/10 |

(Continued)

OTHER PUBLICATIONS

Alex, et al., "DeepGNN is a framework for training machine learning models on large scale graph data", Retrieved from Internet URL: - https://github.com/microsoft/DeepGNN, Dec. 30, 2024, 03 Pages.

(Continued)

*Primary Examiner* — Jorge A Casanova
(74) *Attorney, Agent, or Firm* — Nicholson De Vos Webster & Elliott LLP

(57) ABSTRACT

Embodiments of the disclosed technologies are capable of deconstructing a graph using database management approaches. Embodiments describe receiving an event trigger associated with a first node of a graph. The event trigger includes a node identifier of the first node. The embodiments further describe generating a first query for a neighbor identifier associated with a second node of the graph using the node identifier. The neighbor identifier is queried from a first data store. Embodiments further describe generating a second query for a feature corresponding to the neighbor identifier. The feature is queried from a second data store. Embodiments further describe generating an embedding of the event trigger using the node identifier, the neighbor identifier and the feature.

20 Claims, 6 Drawing Sheets

(56) References Cited

U.S. PATENT DOCUMENTS

| | | | |
|---|---|---|---|
| 2021/0374499 A1* | 12/2021 | Wu | G06F 17/16 |
| 2022/0114456 A1* | 4/2022 | Nouri | G06F 9/4881 |
| 2023/0049817 A1* | 2/2023 | Shi | G06F 18/211 |
| 2023/0121966 A1* | 4/2023 | Coutinho | G06F 16/2458 |
| | | | 705/30 |
| 2023/0385337 A1* | 11/2023 | Mieszkowski | G06N 5/042 |

OTHER PUBLICATIONS

Chien, et al., "Adaptive Universal Generalized Pagerank Graph Neural Network", In International Conference on Learning Representations, 2021, 24 Pages.

Hamilton, et al., "Inductive Representation Learning on Large Graphs", In Repository of arXiv:1706.02216v4, Sep. 10, 2018, 19 Pages.

Velickovic, et al., "Graph Attention Networks", arXiv:1710.10903, Feb. 4, 2018, 12 pages.

* cited by examiner

FIG. 2
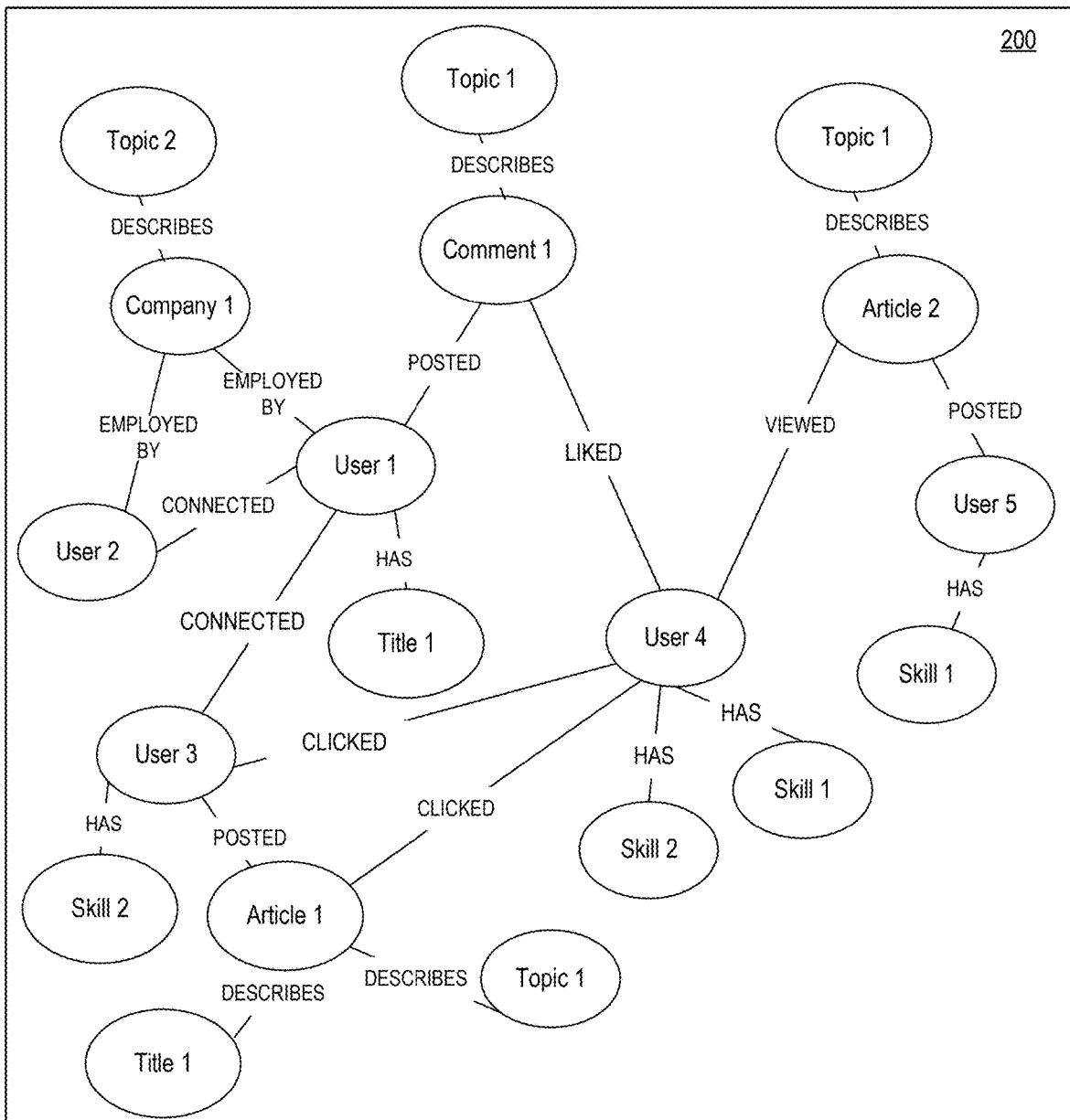
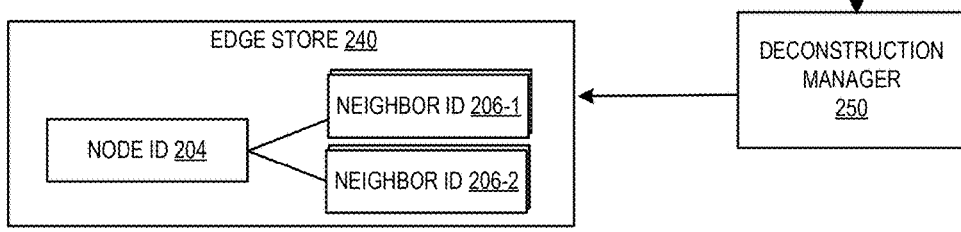

DECONSTRUCTING GRAPHS USING A DATABASE MANAGEMENT APPROACH

TECHNICAL FIELD

Embodiments of the invention relate to the field of database management.

BACKGROUND

A recommendation engine is a software program that helps people find information online. A user provides search query terms through a search interface. The recommendation engine initiates a search for digital content items according to the user-provided search query. The recommendation system identifies digital content items that are related to the search query and retrieves such digital content items for display to the user.

BRIEF DESCRIPTION OF THE DRAWINGS

The invention may best be understood by referring to the following description and accompanying drawings that are used to illustrate embodiments of the invention. In the drawings:

FIG. 2 is an example of a graph deconstructed by the deconstruction manager, in accordance with some embodiments of the present disclosure.

DETAILED DESCRIPTION

Figure 1:
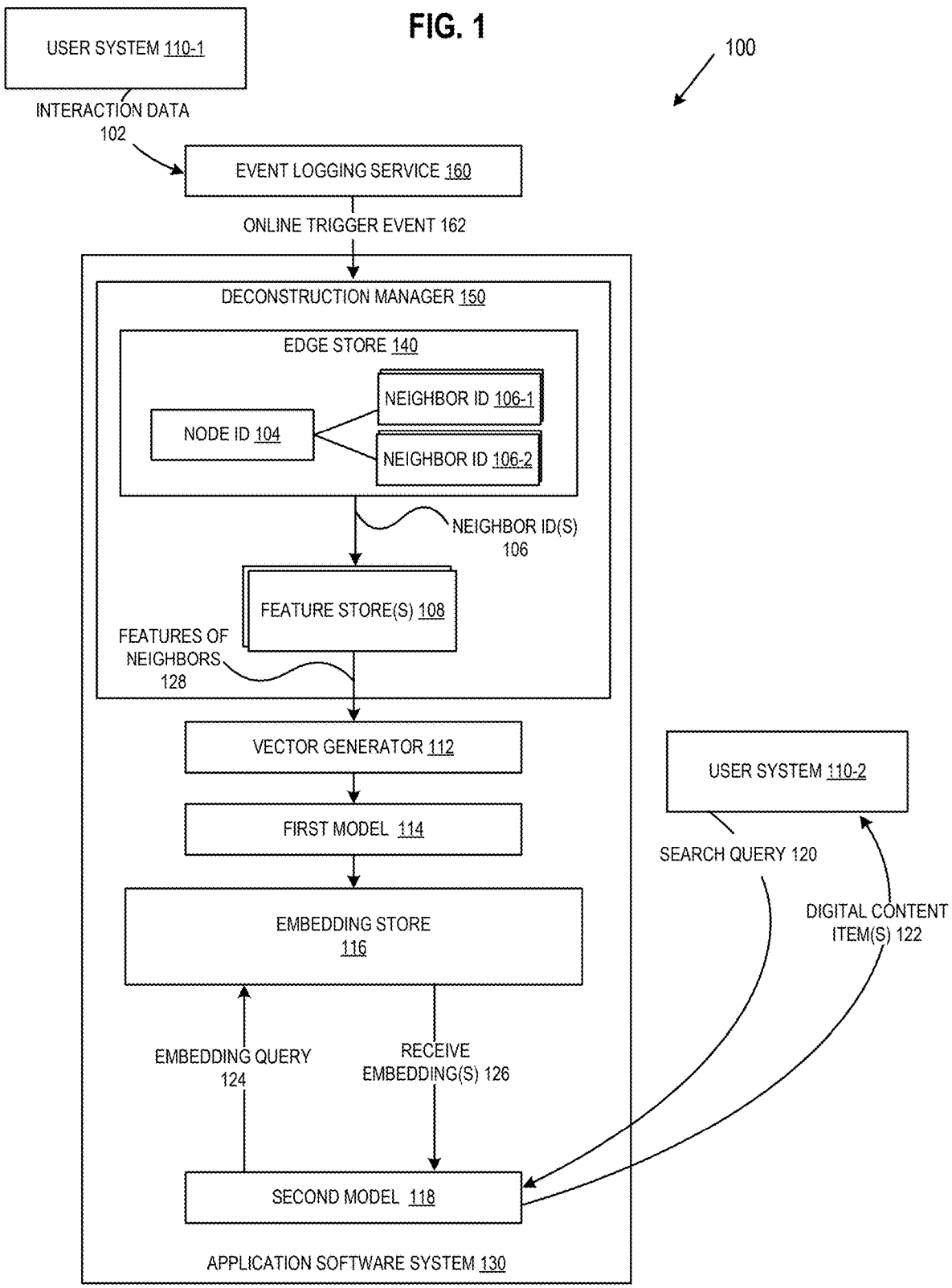
FIG. 1 is a flow diagram of an example method for using a deconstruction manager to synthesize data from a graph using components of a computing system that includes an application software system and a user system, in accordance with some embodiments of the present disclosure.

A graph is a way to represent a relationship of entities using nodes and edges. Nodes of the graph represent users (e.g., user profiles), organizations (e.g., companies, schools, institutions), content items (e.g., job postings, announcements, articles, comments, and shares), skills, titles, or other topics and/or objects. Edges of the graph represent relationships between or among nodes of the graph. For example, if a node (e.g., a user) views and accepts a message from another user, an edge of the graph would be created to represent the connection between the message-receiving user entity with the message-sending user entity in the graph, where the edge may be tagged with a label such as "accepted."

In some applications, such as a professional networking application, the graph can include billions of nodes and edges. Machine learning models such as graph neural networks (GNNs) are configured to capture the geometric relationships between nodes and edges by iteratively developing statistical correlations used to generate embeddings that map each node of a graph to an embedding space where similar embeddings are positioned in close proximity in the embedding space. Embeddings are mathematical representations of nodes and edges in the graph. The embeddings generated by the GNN can be used by other machine learning models for node classification (e.g., assigning a label to an entity of the graph), edge prediction (e.g., determine a probability of an entity connecting with a different entity on the graph), clustering (e.g., making subgraphs of the graph, assigning labels to groups of entities), and the like. For example, embeddings generated by the GNN can be retrieved by recommendation engines and used to provide digital content items to the user (e.g., a recommendation of an article a user should click on, a recommendation of another user a searcher user may be interested in connecting with).

The graph is maintained such that the nodes and edges of the graph reflect dynamic changes made by users (or other entities represented as nodes of the graph). Tracking the addition of nodes, the removal of nodes, and the relationships of each node between other nodes of the graph can be a complex task and can consume significant time and computing resources such as power, bandwidth, memory. As a result, conventional systems maintain the nodes and edges of the graph offline. Maintaining the nodes and edges of the graph offline refers to maintaining the nodes and edges of the graph using stored data.

Updating the graph offline forces downstream systems or applications to use obsolete graph data until the graph data is updated. For example, if a user creates an article and posts the article online, the article may not appear in another user's search results for 24 hours, by virtue of the graph being updated and embeddings generated for that article offline (e.g., overnight). That is, a recommendation engine that provides search results to users would not include information associated with the article by virtue of receiving out-of-date graph information. The delay associated with the offline generation of embeddings responsive to the offline maintenance of the graph renders the recommendation engine unable to recommend the article.

Aspects of the present disclosure address the above and other deficiencies by deconstructing graphs using a database management approach. In the embodiments described herein, a graph is deconstructed by synthesizing nodes and edges of the graph into key-value pairs. The synthesis of the graph into key-value pairs enables a deconstruction manager to generate and update embeddings online. As a result, downstream systems or applications that depend on the embeddings generated from the nodes and edges of the graph receive up-to-date information. For example, if a user uploads a digital content item at 8:00 am, the disclosed technologies can generate an embedding for the digital content item such that a second user can receive the digital content item as a recommendation at 8:01 am.

The disclosure will be understood more fully from the detailed description given below, which references the accompanying drawings. The detailed description of the drawings is for explanation and understanding, and should not be taken to limit the disclosure to the specific embodiments described.

In the drawings and the following description, references may be made to components that have the same name but different reference numbers in different figures. The use of different reference numbers in different figures indicates that the components having the same name can represent the same embodiment or different embodiments of the same component. For example, components with the same name but different reference numbers in different figures can have the same or similar functionality such that a description of one of those components with respect to one drawing can apply to other components with the same name in other drawings, in some embodiments.

Also, in the drawings and the following description, components shown and described in connection with some embodiments can be used with or incorporated into other embodiments. For example, a component illustrated in a certain drawing is not limited to use in connection with the embodiment to which the drawing pertains, but can be used with or incorporated into other embodiments, including embodiments shown in other drawings.

FIG. 1 is a flow diagram of an example method for using a deconstruction manager to synthesize data from a graph using components of a computing system that includes an application software system and a user system, in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of the deconstruction manager 150, including, in some embodiments, components shown in FIG. 1 that may not be specifically shown in FIG. 4, or by the deconstruction manager 450 of FIG. 4, including, in some embodiments, components shown in FIG. 4 that may not be specifically shown in FIG. 1, or by components shown in any of the figures that may not be specifically shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In example computing system 100 of FIG. 1, an example application software system is shown, which includes the deconstruction manager 150, the edge store 140, one or more feature stores 108, a vector generator 112, a first model 114, an embedding store 116, and a second model 118.

In the example of FIG. 1, the components of the application software system 130 are implemented using an application server or server cluster. In other implementations, one or more components of the application software system 130 are implemented on a client device, such as a user system 110 shown in FIG. 1 or user system 410 described herein with reference to FIG. 4. For example, some or all of application software system 130 is implemented directly on the user's client device in some implementations, thereby avoiding the need to communicate with servers over a network such as the Internet. In yet other implementations, the components of the deconstruction manager 150 are executed as an application or service, executed remotely or locally.

Application software system 130 is any type of application software system that provides or enables at least one digital content item to be presented to the user system 110. Examples of application software system 130 include but are not limited to connections network software, such as social media platforms, and systems that are or are not based on connections network software, such as general-purpose search engines, job search software, recruiter search software, sales assistance software, content distribution software, learning and education software, or any combination of any of the foregoing.

User systems 110-1 and 110-2 (collectively referred to herein as user systems 110) include at least one computing device, such as a personal computing device, a server, a mobile computing device, or a smart appliance. User systems 110 include at least one software application, enabling the user systems 110 to bidirectionally communicate with the application software system 130. Additionally, the user systems 110 include a user interface that allows a user to enter a search query and receive a display of digital content items obtained responsive to the search query (e.g., one or more recommended digital content items).

Interaction data 102 is any data received by the application software system 130 associated with a user of the user system 110-1. For example, a user of user system 110-1 may generate a user profile and/or register to become a member of the application software system. During such profile generation, the user inputs personal information, such as a name, age (e.g., birthdate), gender, interests, contact information, home town, address, spouse's and/or family members' names, educational background (e.g., schools, majors, matriculation and/or graduation dates, etc.), employment history, skills, interests, professional, employment history, area of expertise, organizations, and so on. In some embodiments, the profile can be that of an entity (e.g., information about an organization such as a company, a school, etc.).

Interaction data 102 can also include actions performed by a user of the user system 110-1. For example, a user can click on a digital content item for viewing, click on a digital content item and save the digital content item (e.g., download the digital content item, add the digital content item to a list of saved digital content items associated with the user), engage with other users of application software system 130 (e.g., send messages, write comments, "like" comments, where liking a comment includes approving of, or otherwise showing an interest in the comment).

Event logging service 160 captures and records interaction data 102 generated by the user of the user system 110-1. For instance, when a user of the user system 110-1 clicks on a user interface element, such as a message, a link, or a user interface control element such as a view, comment, share, or reaction button, or uploads a file, or creates a message, loads a web page, or scrolls through a feed, etc., interaction data is generated 102 and the event logging service 160 fires an event to capture an identifier, such as a session identifier, an event type, a date/timestamp at which the user interface event occurred, and possibly other information about the user interface event. The event type can include an identifier for a node being interacted with. For example, if a user profile is updated, the user profile is the event interacted with and therefore the source node associated with node ID 104 described herein. If a job posting is updated by a user, the job posting is the event interacted with and therefore the source node associated with the node ID 104 is the node corresponding to the job posting (as opposed to the node corresponding to the user creating or updating the job posting). In some embodiments, both the node corresponding to the job posting and the node corresponding to the user creating or updating the job posting are included as information in the event type. The event logging service 160 formulates the interaction data 102 into a data stream and monitors the data stream for online trigger events 162.

A trigger event is an event that changes one or more aspects of the graph of the application software system 130. Whereas some trigger events can be stored (e.g., offline trigger events), an online trigger event is an event identified responsive to an online user interaction in real time via interaction data 102. As described herein, a graph is deconstructed by the deconstruction manager 150 such that information of the graph is translated into key-value pairs. An example of a deconstructed graph is illustrated in FIG. 2. An online trigger event 162 includes an event that would create or update a node of the graph. For example, an online trigger event 162 can include a user creating a job posting and uploading the job posting to the application software system 130. An online trigger event 162 also includes events that would create or update an edge in the graph. For example, a user can interact with a digital content item (by clicking on the digital content item). The interaction with the digital content item represents the creation of an edge in the graph. In some embodiments, the event logging service 160 identifies positive user feedback (any interaction between the user and a digital content item such as clicking on a user profile, liking an article, sharing an article, sending a message to a user, and the like) to identify trigger events 162 that create or update edges in the graph.

Given large networks such as those of a professional networking service where millions of users are interacting with digital content items or other entities, the number of users generating interaction data 102 to be monitored and processed by the event logging service 160 is significant. With such a large network of users, the number of users performing interactions that would have the effect of updating the graph (such as performing online trigger events 162) is also significant. Accordingly, whereas conventional systems store trigger events and update the graph offline (e.g., as a result of the magnitude of online trigger events and the time required to update the graph) the deconstruction manager 150 disclosed herein configures information that would be used to update the graph as a key-value pair. Key-value pairs stored in a key-value store can be processed faster than the time it would take to update the graph, enabling downstream models such as model 118 to process up-to-date information. For example, the latency associated with querying a key-value store for key-value pairs is tens of milliseconds given a peak query per second exceeding 5 k.

In operation, a user using user system 110-1 interacts with the application software system 130, generating interaction data 102. The event logging service 160 of the application software system 130 monitors the interaction data 102 for online trigger events 162. Responsive to identifying a trigger event 162, the event logging service 160 passes the trigger event 162 and information associated with the trigger event 162 to the deconstruction manager 150 such that the deconstruction manager 150 can synthesize the interaction data 102 into key-value pairs.

The deconstruction manager 150 translates the graph of the application software system 130 (described, for example, in FIG. 2) into a data structure that can be stored in a database. In operation, the deconstruction manager 150 deconstructs information of a graph by creating key-value pairs stored in a key-value database. As a result, the deconstruction manager 150 configures and maintains graph information using a database management approach.

In a graph, a single node can be connected to multiple different types of nodes using multiple edges. For example, referring briefly to FIG. 2, the User 1 node is connected to Comment 1, Company 1, User 2, User 3, and Title 1 by virtue of the POSTED edge, the EMPLOYED BY edge, the CONNECTED edges, and the HAS edges, respectively. In FIG. 2, the Comment 1 is a first type of node (e.g., a digital content node), the Company 1 is a second type of node (e.g., an entity node), the User 2 and User 3 nodes are a third type of nodes (e.g., a member node), and the Title 1 node is a fourth type of node (e.g., an attribute node). Similarly, the POSTED edge is a first edge type (e.g., a member to digital content item edge type), the EMPLOYED BY edge is a second edge type (e.g., a member to entity edge type), the CONNECTED edge is a third edge type (e.g., a first member to second member edge type), and the HAS edge is a fourth edge type (e.g., a member to an attribute edge type).

Referring back to FIG. 1, the deconstruction manager 150 organizes the edge store 140 such that connections between nodes are stored as key-value pairs. For example, a source node (represented by the node ID 104) can be paired with lists of one or more neighboring nodes (illustrated as a first list of neighbor IDs 106-1 and a second list of neighbor IDs 106-2). Each neighbor ID in a list of neighbor IDs (e.g., the first list of neighbor IDs 106-1 and the second list of neighbor IDs 106-2) is related according to an edge type. For example, the first list of neighbor IDs 106-1 represents a list of neighbors connected to a source node (e.g., node ID 104) according to a first edge type (e.g., a member to entity edge type). Similarly, the list of neighbor IDs 106-2 represents a list of neighbors connected to the source node according to a second edge type (e.g., the first member to a second member edge type). Further, each neighbor ID in a list of neighbor IDs (e.g., the first list of neighbor IDs 106-1 and the second list of neighbor IDs 106-2) is the same node type. For example, the first list of neighbor IDs 106-1 represents a list of neighbors connected to a source node that are a first node type (e.g., entity nodes), and neighbor ID 106-2 represents a list of neighbors connected to source node that are a second node type (e.g., member nodes).

The edge store 140 is a database such as a key-value database. A key-value database is a relational database that organizes and stores data records as key-value pairs using Non-Structured Query Language (NoSQL). Structured data is constrained data where one or more of the values and/or the format of the data is constrained. Unstructured data is data that is not in a predetermined format or style such as free-form text (e.g., one or more words, phrases, or sentences). For example, unlike unstructured data, which can have a variable number of characters, structured data can be stored in tables such that the rows and columns of the tables define predetermined attributes of the structured data. The key uniquely identifies the data record, i.e., the value associated with the key of the edge store 140. Pairs of data stored in the edge store 140 include node ID 104 (representing a source node of a graph) and corresponding neighbor ID 106 (representing nodes of the graph that are related to the node ID in a first-degree connection).

As described with reference to FIG. 3, the deconstruction manager 150 queries the edge store 140 for first degree nodes of a source node, where the source node is a node identified in the online trigger event 162. The result of the queries to the edge store 140 is one or more lists of neighbor IDs 106 (which can include the list of neighbor IDs 106-1 and the list of neighbor IDs 106-2, or some combination).

It should be appreciated that one or more of the lists of neighbor IDs 106-1 and 106-2 can be null. For example, the node ID 104 may not be connected to any particular type of neighbor nodes. In a non-limiting example, a member (represented as member source node) may have partially completed their profile information such that the member did not include any skills in their profile information. Accordingly, the graph representation of the member would include the member source node disconnected from any skills. Similarly, deconstruction manager 150 would determine that the member source node would not be connected to neighboring nodes via a member to skill edge type. As a result, the list of neighbor IDs for skills of that member source node would be blank.

The deconstruction manager 150 uses the neighbor IDs 106 to query one or more feature stores 108. The feature stores 108 can be any one or more databases that store information associated with a key or a value of the edge store 140. In some embodiments, the features stores 108 are key-value databases storing key-value pairs, where the key of the key-value pair is a neighbor ID (in a list of neighbor IDs 106) and the value of the key-value pair is information associated with that neighbor ID (e.g., one or more features). In operation, the deconstruction manager 150 queries a feature store 108 for each neighbor in the list of neighbor IDs 106. As a result, the feature store 108 produces one or more features for each neighbor in the neighbor IDs 106 (e.g., features of neighbors 128).

The vector generator 112 receives the list of features of neighbors 128 and performs one or more processing operations on the features of neighbors 128 to generate a vector. Example processing operations performed on the features of neighbors 128 can include concatenating the features, aggregating the features, normalizing the features, binarizing the features, averaging the features, or some combination.

The first model 114 is a model configured to receive a vector (generated by the vector generator 112) and output an embedding. The embedding generated by the first model 114 represents an update (or creation) of an embedding corresponding to the source node (e.g., the node ID 104 or the digital content identifier, entity identifier, or user identifier included in the online trigger event 162).

In some embodiments, the first model 114 is a GNN that receives the input vector (based on the features of nodes that neighbor the source node and features of the source node) and generates an embedding. The generated embedding maps the source node of the graph to an embedding space, where embeddings that are similar to each other (by virtue of similar neighbor nodes, similar features, etc.) are positioned closer together in the embedding space. The generated embedding represents a numerical representation of the relationships between nodes in a graph, as opposed to the graphical representation of nodes in the graph.

The generated embedding is stored in the embedding store 116 such that subsequent models (such as second model 118) can retrieve the generated embedding and use the generated embedding for subsequent tasks. The embedding store 116 can be any data storage system that stores embeddings.

A second user using a second user system (e.g., user system 110-2) enters a search query 120. For example, the search query 120 can query the application software system 130 (which calls the second model 118 in computing system 100) for a list of job openings in the Artificial Intelligence space. The search query 120 includes a user identifier that maps the user of user system 110-2 (e.g., user 2) to the search query 120. The user of the user system 110-2 represents a source node.

The second model 118 can be any model that can respond to search query 120. For example, the second model 118 can be a recommendation engine that generates an ordered list of digital content recommendations such as user profiles, articles, blogs, messages, videos, and the like responsive to the search query 120.

The second model 118 queries the embedding store 116 for embeddings associated the source node (e.g., user 2), embeddings associated with the search query 120, or some combination (e.g., embedding query 124) and receives embeddings 126 associated with the source node (e.g., user 2), the search query 120, or some combination.

The second model 118 receives the embeddings 126 and processes the embeddings to fetch digital content item(s) 122 responsive to the search query 120. For example, using the received embeddings 126, the second model 118 can make a prediction of job openings in the Artificial Intelligence space user 2 is most likely to interact with. The job openings with an interaction score that satisfies a threshold interaction score are filtered from other job postings and fetched for display to the user. For ease of illustration, the computing system 100 does not include fetching the digital content item(s). The fetched digital content item(s) 122 are passed to the user system 110-2 for display to the user.

In the computing system 100, a job posting can be created at 8:00 am by a user using user system 110-1. Because the deconstruction manager 150 can process the interaction data and synthesize information that would conventionally be used to update a graph database into information that can be used to update a key-value database, the embedding associated with the job posting become available for subsequent use by other models. Accordingly, at 8:01 am, the second model 118 can provide the job posting as a digital content item 122 for display to the user 110-2 responsive to the search query 120. It should be appreciated that if the user using user system 110-2 applies for the job positing, interaction data 102 is generated and the event logging service 160 would identify an online trigger event 162. Accordingly, the deconstruction manager would add the job posting node as a new neighbor of the user 2 node according to the edge type (e.g., a digital content item edge type, representing a relationship between user 2 and the digital content item job posting).

The examples shown in FIG. 1 and the accompanying description above are provided for illustration purposes. This disclosure is not limited to the described examples. Additional or alternative details and implementations are described herein.

FIG. 2 is an example of a graph deconstructed by the deconstruction manager, in accordance with some embodiments of the present disclosure.

The deconstruction manager 250 deconstructs the graph 200 into key-value pairs (node ID 204 and corresponding neighbor ID 206-1 and neighbor ID 206-2) stored in the edge store 240. The pairing of nodes and neighbors according to edge types as described herein preserves the relationships of the graph 200. Graph processes such as temporal processing and sampling of the graph 200 are not performed by systems such as the application software system 130 described in FIG. 1, conserving memory, power, bandwidth, and other computing resources. Instead of traversing the graph 200 responsive to queries, the deconstruction manager 250 queries the edge store 240. The computing time associated with querying a key-value store (e.g., edge store 240) is faster than the computing time associated with traversing graph 200. As a result, embeddings can be generated and updated faster than conventional systems that rely on traversing a graph 200. Accordingly, downstream models such as second model 118 described in FIG. 1 can perform tasks (such as making recommendations) using up-to-date graph information.

In the example of FIG. 2, graph 200 includes node types. For example, digital content nodes are a type of nodes that represent digital content items such as Comment 1, Article 1, and Article 2. Entity nodes are a type of nodes that represent entities such as Company 1. Member nodes are a type of nodes that represent members such as User 1, User 2, User 3, User 4, and User 5. A member can be a user who has registered with an entity such as a professional networking service. Registering with the entity can include creating a user profile (with corresponding profile information), reading and agreeing to the terms of service, or paying a subscription. Attribute nodes are a type of nodes that represent an attribute of a member, an entity, a digital content item, and the like. As shown in graph 200, attribute nodes include Topic 1, Topic 2, Title 1, Skill 1, and Skill 2.

Graph 200 also includes edge types. Edge of graph 200 individually and/or collectively represent various different types of relationships between or among the nodes. In the graph 200, edges between user nodes represent relationships between nodes. For example, edges can represent online social interactions between the users represented by the nodes. As an example, in the entity graph 200, User 4 has clicked on the profile of User 3 by virtue of the CLICKED edge between User 4 and User 3. User 5 has posted Article 2 by virtue of the POSTED edges between User 5 and Article 2. Additionally, User 4 is associated with Skill 1 by virtue of the HAS edge between User 4 and Skill 1. Similarly, User 1 is associated with Title 1 by virtue of the HAS edge between User 1 and Title 1. Further, User 1 and User 2 are associated with Company 1 by virtue of the EMPLOYED BY edge between Company 1 and User 2, and Company 1 and User 1. Similarly, Article 1 is associated with Title 1 and Topic 1 by virtue of the DESCRIBES edge between Article 1 and Title 1 and Article 1 and Topic 1.

In some embodiments, data can be linked with both nodes and edges. For example, when the graph 200 is created (or updated), nodes and/or edges can be assigned a timestamp that indicates the date and time at which the edge and/or node is created or updated. Additionally, nodes can be weighted based on, for example, edge counts or other types of computations, and edges can be weighted based on, for example, affinities, relationships, activities, similarities, or commonalities between the nodes connected by the edges, such as common attribute values (e.g., two users have the same job title or employer, or two users are n-degree connections in a user connection network).

In some implementations, combinations of nodes and edges are used to compute various scores. For instance, based on relative edge counts, a skill affinity score computed for User 4 might be higher than the skill affinity score computed for User 3 because User 4 is associated with a greater number of Skill nodes than the Skill nodes associated with User 3 (e.g., User 4 is associated with Skill 1 and Skill 2, while User 3 is associated with Skill 2). Such scores are stored in the feature store 108 described in FIG. 1.

The examples shown in FIG. 2 and the accompanying description, above are provided for illustration purposes. This disclosure is not limited to the described examples.

Figure 3:
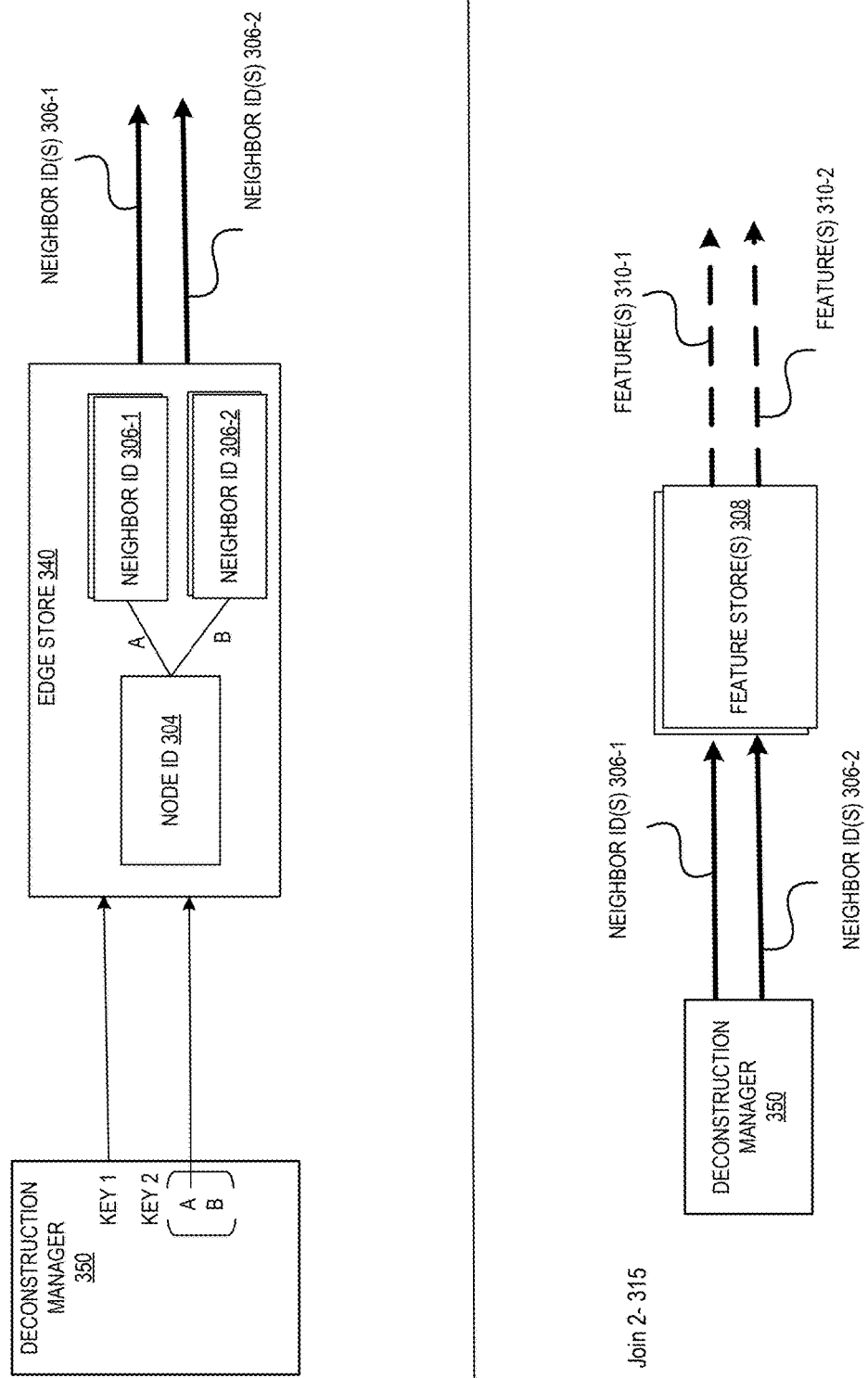
FIG. 3 illustrates an example of the sequential join performed by the deconstruction manager to generate or update embeddings of a deconstructed graph, in accordance with some embodiments of the present disclosure.

FIG. 3 illustrates an example of the sequential join performed by the deconstruction manager to generate or update embeddings of a deconstructed graph, in accordance with some embodiments of the present disclosure.

As described herein, the edge store 340 is a key-value database. A key-value database is a particular database used for storing structured data in key-value pairs. Keys of the key-value pairs are identifiers for values. In other words, values can be retrieved from key-value databases using a particular key. Data in key-value databases is stored in arrays, beneficially making the key-value database highly partitionable and able to be scaled. In addition, the latency and complexity associated with performing reading operations using key-value databases (e.g., NoSQL) is faster than the latency and complexity associated with performing other types of read operations (e.g., such as the read operations associated with SQL join commands). A join command (e.g., a query) can be used to join columns of an array into a new table or array. The deconstruction manager 350 leverages sequential join commands to query arrays of the edge store 340 to generate a new table or array that includes node and edge information associated with an online trigger event. For example, a first query of sequential join commands queries key1 to identify value1 and value2. A second query of the sequential join commands queries value1 to identify value1_1, value1_2, and value1_3. A third query of the sequential join commands queries value2 to identify value2_1, value2_2, and value2_3.

As described herein, a trigger event is an event that changes one or more aspects of a graph. For example, a trigger event can indicate that a node of a graph should be updated or created, or an edge of the graph should be updated or created. The trigger event is an online trigger event when the event is identified in real time responsive to an interaction performed by an active or online user. In contrast, an offline trigger event is a trigger event that has been stored. Accordingly, responsive to an event that changes the graph, the deconstruction manager 350 is triggered to deconstruct the graph information and update embeddings associated with graph using the edge store 340.

The deconstruction manager 350 queries the edge store 340 to values that represent neighboring nodes of a node associated with an online trigger event. As described herein, the online trigger event includes identifying information such that the deconstruction manager 350 can determine a key (e.g., a source node of the graph represented by a node ID 304) associated with the online trigger event. In operation, the deconstruction manager 350 queries the edge store 340 for values representing neighboring nodes of a graph using two keys. The first key represents the source node and the second key represents an edge type in a subset of edge types of the source node. A graph includes a set of edge types. Each edge type in the set of edge types represents a possible edge relationship between two nodes of the graph. The deconstruction manager 350 selects the subset of edge types according to the possible edge relationship of source node. In a non-limiting example, a member source node can have four possible edge relationships with the member source node such as skill ID, member ID, title ID, and entity ID. Accordingly, the subset of edge types for a member source node includes four edge types, whereas the set of edge types for the graph includes the subset of edge types for the member node, in additional to other subsets of edge types for other node types of the graph. Each edge type represents a type of connection between the source node and a neighbor node. For example, a skill ID edge type represents a connection between the member source node and a skill, the member ID edge type represents a connection between the member source node and a secondary member (e.g., the member connected with another member, followed another member, saved another member profile), the title ID edge type represents a connection between the member source node and a title, and the entity ID edge type represents a connection between the member source node and an entity (e.g., the member follows a particular entity, the member is an employee of the particular entity).

As shown, the deconstruction manager 350 queries the edge store 340 using key 1, which represents a source node (e.g., the node ID 304). The source node corresponds to the node associated with the online trigger event. For example, a member creates a profile such that the source node is a member ID. Additionally or alternatively, a member uploads a job posting such that the source node is a job ID.

The second key includes an edge type of subset of edge types. For every node type, there is a predetermined number of edge types for that node type. The predetermined number of edge types for that node includes the subset of edge types for that node. As shown in example 300, the predetermined number of edge types for the node ID 304 is two edge types. The subset of edge types includes A and B.

The deconstruction manager 350 queries the edge store 340 a number of times equal to the predetermined number of edge types. Accordingly, in example 300, the deconstruction manager queries the edge store 340 twice. Each time the deconstruction manager queries the edge store 340 key 1 remains the same (e.g., the node ID 304) and the key 2 changes according to the edge type in the subset of edge types.

The deconstruction manager 350 generates a first query to the edge store 340 with key 1 as node ID 304 (e.g., the member source node) and key 2 as A. The first query is represented by the two solid lines connecting the deconstruction manager 350 to the edge store 340. In operation, the deconstruction manager 350 is querying the edge store 340 for the edge type A connected to the node ID 304. The output of the edge store 340 is a list of neighbor ID 306-1 (represented by a first thick solid line output by the edge store 340).

The deconstruction manager 350 generates a second query to the edge store 340 (not shown), with key 1 as node ID 304 and key 2 as B. In operation, the deconstruction manager 350 is querying the edge store 340 for edge type B connected to node ID 304. The output of the edge store 340 is a list of neighbor ID 306-2 (represented by a second thick solid line output by the edge store 340).

The thick solid lines output of the edge store 340 represent a list of the neighboring nodes 306 (e.g., values) of a particular edge type associated with the source node (e.g., keys). That is, each list of neighboring nodes 306 represents a relationship defined by the edge type with respect to the source node (e.g., node ID 304). As shown in example 300, the edge store 340 outputs two lists of neighboring nodes, where neighbor ID 306-1 and neighbor ID 306-2 are collectively referred to herein as neighbor ID 306. In general, the number of lists of neighboring nodes 306 output by the edge store 340 is equal to the number of edge types in the subset of edge types.

As described herein, one or more of the lists of the neighbor IDs 306-1 and 306-2 can be null. For example, a user may partially complete their profile information such that the user did not include any skills in their profile. Accordingly, the deconstruction manager 350 would determine that there are no values for the particular key. Graphically, the representation would indicate a member source disconnected from any neighboring nodes via a member to skill edge type. Accordingly, if the deconstruction manager 350 queries the edge store 340 for a list of neighboring nodes 306 of the node ID 304 with the skill edge type, the output of the edge store 340 is a null or blank list.

The deconstruction manager 350 maintains the key-value pairs of the edge store 340. For example, the deconstruction manager 350 adds key-value pairs corresponding to new keys. In operation, the source node associated with the online trigger event can be a new node with a new node ID (e.g., a new key to be added to the edge store 340). In this example, the new source node is not stored in the edge store 340 so a new node ID is generated to identify the new source node. In some embodiments, nodes are identified as new nodes using a tag or other identifier received from one or more upstream processes. As a result, the deconstruction manager 350 can create or remove keys using one or more identifiers received from upstream processes. The deconstruction manager 350 adds the new node ID as a key to the edge store 340 and determines the predetermined number of edge types (and the subset of edge types) based on the node type of the new source node.

The deconstruction manager 350 can also update values of a key-value pair. For example, a key with one or more values is stored in edge store 340. The deconstruction manager 350 can add or remove values paired with the key. For example, when one or more new neighbors are identified for a key, the neighbor IDs are added to the list of neighbor IDs according to the edge type connecting the source node with the neighbor ID, thereby adding values to a key-value pair. For example, a first user connects with a second user, representing a new relationship between the first and second users. Because the first user is connecting with a second user, the edge type is the member ID edge type. Accordingly, the node ID of the second user (e.g., the value) is added to the list of neighbor IDs of the first user (e.g., the key) associated with the member ID edge type. In some embodiments, neighbors are identified as new neighbors using a tag or other identifier received from one or more upstream processes. As a result, the deconstruction manager 350 can add or remove values paired with the key according to one or more identifiers received from upstream processes.

The example of FIG. 3 illustrates two sequential join commands, a first join command 310 used to obtain a list of neighboring nodes with respect to a source node, and a second join command 315 used to obtain a list of features for each neighboring node in a list of neighboring nodes 306.

The first join command obtains a list of first-degree neighbors (e.g., neighbors that are directly connected to the source node). However, it should be appreciated that the deconstruction manager 350 can issue more than two sequential join commands to obtain lists of neighbors at other degrees. For example, the deconstruction manager 350 can query the edge store 340 for a list of neighbors for each neighbor in the list of neighbors with neighbor ID 306-1. In the above example, a first neighbor ID of the list of neighbor IDs 306-1 is used as key 1, and an edge type of the subset of edge types associated with the first neighbor ID of the list of neighbor ID 306-1 is used as key 2. In this manner, the second list of neighbors (not shown) retrieved by the deconstruction manager 350 represents second degree neighbors of the node ID 304 according to the edge type. The edge store 340 is queried for second degree neighbors of the node ID 304 according to other edge types in the subset of edge types. Additional degrees of neighbors can be identified using further sequential joins.

For the second join, the deconstruction manager 350 queries one or more feature stores with the list of neighbor IDs 306 obtained from the edge store. In some embodiments, the deconstruction manager 350 queries a feature store a number of times equal to the number of neighbor IDs in each list of neighbor IDs 306. As a result, the deconstruction manager obtains a list of features of each neighbor ID in the list of neighbor IDs 306. As shown in example 300, the list of features 310-1 (represented as a dashed thick line) corresponds to features for each neighbor in the list of neighbor IDs 306-1. Similarly, the list of features 310-2 (represented as a dashed thick line) corresponds to features for each neighbor in the list of neighbor IDs 306-2. In some embodiments, multiple feature stores 308 are queried. For example, a first feature store is queried for features of a first node type of neighbor ID 306-1 and a second feature store is queried for features of a second node type of neighbor I 306-2. In some embodiments, multiple feature stores 308 are queried for features of a node type. For example, if the node type is digital content items, the deconstruction manager 350 can query a feature store for features of articles (representing article nodes in a list of neighbor IDs), a feature store for comments (representing comment nodes of the list of neighbor IDs), and the like.

Figure 4:
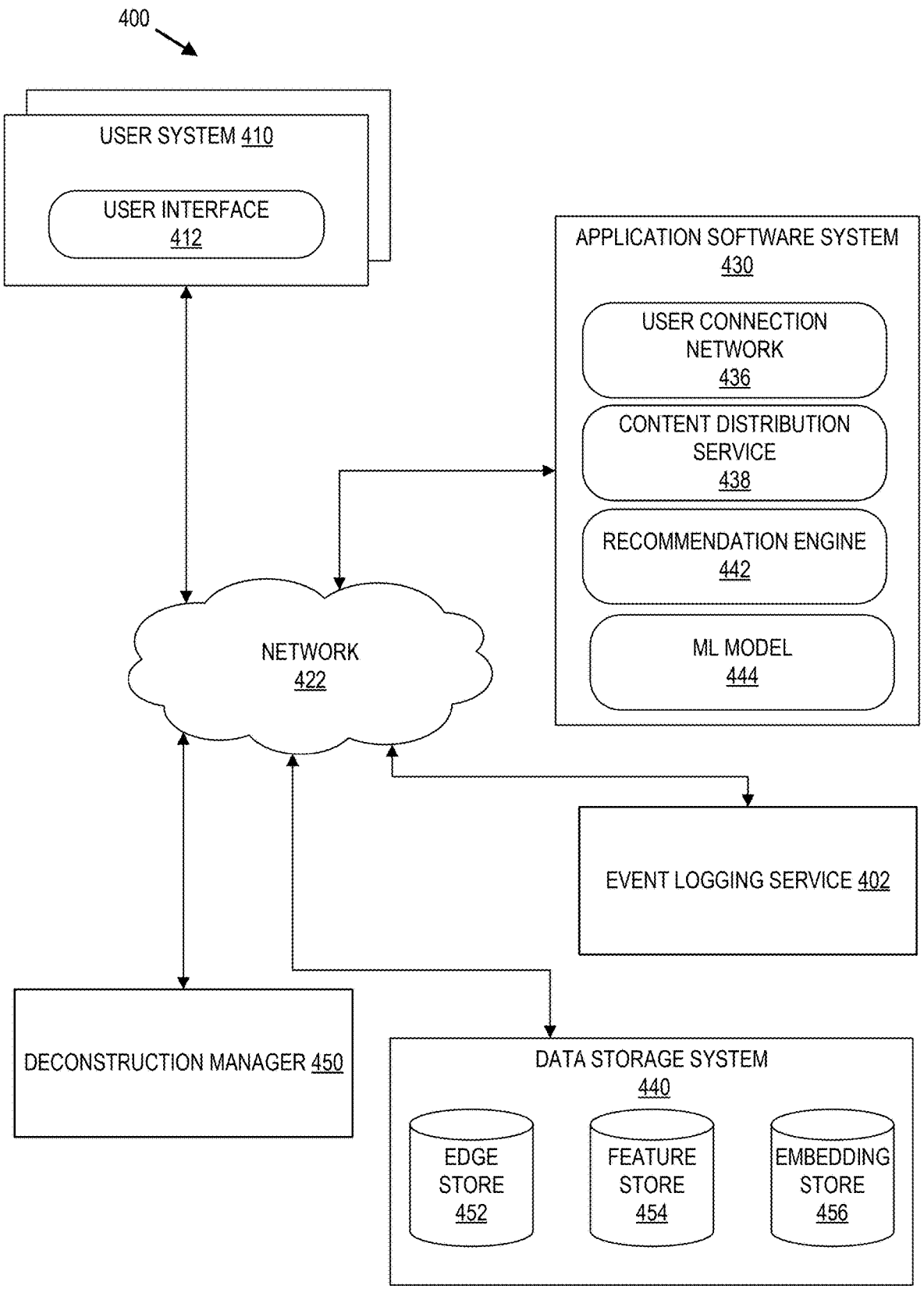
FIG. 4 is a block diagram of a computing system that includes deconstruction manager, in accordance with some embodiments of the present disclosure.

FIG. 4 is a block diagram of a computing system that includes deconstruction manager, in accordance with some embodiments of the present disclosure.

In the embodiment of FIG. 4, a computing system 400 includes one or more user systems 410, a network 422, an application software system 430, a deconstruction manager 450, a data storage system 440, and event logging service 402. In some embodiments, one or more portions of the deconstruction manager 450 are implemented at the user system 410. For example, the deconstruction manager 450 is implemented directly upon a single client device such that recommendations are displayed to a user (or otherwise communicated) on-device without the need to communicate with, e.g., one or more servers, over the Internet. In some embodiments, one or more portions of the deconstruction manager 450 are implemented at the application software system 430.

A user system 410 includes at least one computing device, such as a personal computing device, a server, a mobile computing device, a wearable electronic device, or a smart appliance, and at least one software application that the at least one computing device is capable of executing, such as an operating system or a front end of an online system. Many different user systems 410 can be connected to network 422 at the same time or at different times. Different user systems 410 can contain similar components as described in connection with the illustrated user system 410. For example, many different users of computing system 400 can be interacting with many different instances of application software system 430 through their respective user systems 410, at the same time or at different times.

User system 410 includes a user interface 412. In some embodiments, user interface 412 is installed on or accessible to user system 410 by network 422. The user interface 412 can include, for example, a graphical display screen that includes graphical user interface elements such as at least one input box or other input mechanism and at least one slot. A slot as used herein refers to a space on a graphical display such as a web page or mobile device screen, into which natural language text can be entered by a user and/or user selections are received. The locations and dimensions of a particular graphical user interface element on a screen are specified using, for example, a markup language such as HTML (Hypertext Markup Language). On a typical display screen, a graphical user interface element is defined by two-dimensional coordinates. In other implementations such as virtual reality or augmented reality implementations, a slot may be defined using a three-dimensional coordinate system.

In some implementations, user interface 412 enables the user to interact with the application software system 430 including upload, download, receive, send, or share digital content items, including posts, articles, and comments, to initiate user interface events, and to view or otherwise perceive output such as data and/or digital content produced by application software system 430 and/or content distribution service 438. For example, user interface 412 can include a graphical user interface (GUI), a conversational voice/speech interface, a virtual reality, augmented reality, or mixed reality interface, and/or a haptic interface. User interface 412 includes a mechanism for logging in to application software system 430, clicking or tapping on GUI user input control elements, and interacting with digital content. Examples of user interface 412 include web browsers, command line interfaces, and mobile app front ends. User interface 412 as used herein can include application programming interfaces (APIs).

In the example of FIG. 4, user interface 412 includes a front-end user interface component of application software system 430. For example, user interface 412 can be directly integrated with other components of any user interface of application software system 430. In some implementations, access to content of the application software system 430 is limited to registered users of application software system 430 (e.g., members).

Network 422 includes an electronic communications network. Network 422 can be implemented on any medium or mechanism that provides for the exchange of digital data, signals, and/or instructions between the various components of computing system 400. Examples of network 422 include, without limitation, a Local Area Network (LAN), a Wide Area Network (WAN), an Ethernet network or the Internet, or at least one terrestrial, satellite or wireless link, or a combination of any number of different networks and/or communication links.

Application software system 430 includes any type of application software system that provides or enables the creation, upload, and/or distribution of at least one form of digital content distribution of digital content items to users at user systems 410. Examples of application software system 430 include but are not limited to connections network software, such as social media platforms, and systems that are or are not based on connections network software, such as general-purpose search engines, job search software, recruiter search software, sales assistance software, content distribution software, learning and education software, or any combination of any of the foregoing. In some implementations, portions of the deconstruction manager 450 are components of application software system 430.

User connection network 436 includes, for instance, a social network service, professional social network software and/or other social graph-based applications. Application software system 430 can include, for example, online systems that provide social network services, general-purpose search engines, specific-purpose search engines, messaging systems, content distribution platforms, e-commerce software, enterprise software, or any combination of any of the foregoing or other types of software.

In the example of FIG. 4, application software system 430 includes a content distribution service 438. The content distribution service 438 can include a data storage service, such as a web server, which stores digital content items, and transmits recommendations of digital content items to users. Content distribution service 438 can also include, for example, a chatbot or chat-style system of a messaging system, such as a peer-to-peer messaging system that enables the creation and exchange of messages among users of application software system 430, or a news feed. In some embodiments, the content distribution service 438 can include a data storage service, such as a web server, which stores digital content items, uploaded by users, created by users, and/or searched for by users.

In some embodiments, content distribution service 438 processes requests from, for example, application software system 430 and distributes digital content items to user systems 410 in response to requests. A request includes, for example, a network message such as an HTTP (HyperText Transfer Protocol) request for a transfer of data from an application front end to the application's back end, or from the application's back end to the front end, or, more generally, a request for a transfer of data between two different devices or systems, such as data transfers between servers and user systems. A request is formulated, e.g., by a browser or mobile app at a user device, in connection with a user interface event such as a login, click on a graphical user interface element, or a page load. In some implementations, content distribution service 438 is part of application software system 430 or a recommendation. In other implementations, content distribution service 438 interfaces with application software system 430, for example, via one or more application programming interfaces (APIs).

An API refers to an interface or communication protocol in a predefined format between a client and a server, for instance. In response to receiving an API call, an action is initiated and generally a response is communicated. For example, responsive to a search query entered by a user via the user interface, the application software system 430 uses an API call to the recommendation engine 442 to obtain digital content items. Responsive to receiving the API call, recommendation engine 442 identifies one or more digital content items for display to a user using the embeddings stored in the embedding store 456. In some embodiments, the content distribution service 438 receives the API response and configures the digital content items for display to the user via user interface 412.

In the example of FIG. 4, application software system 430 includes a recommendation engine 442. Recommendation engine 442 is a software system designed to search for and retrieve information by executing queries on data stores, such as databases, connection networks, and/or graphs. The queries are designed to find information that matches specified criteria, such as keywords and phrases. Recommendation engine 442 includes a search engine that enables users of application software system 430 to input and execute search queries using user connection network 436, content distribution service 438, and one or more indexes or data stores that store retrievable items, such as digital items that can be retrieved and included in a list of search results.

In operation, the recommendation engine 442 filters digital content items from a set of all available stored digital content items for display to a user, according to the search query entered by the user. The recommendation engine 442 filters such digital content items using embeddings of the digital content items, embeddings of the search query, embeddings of the user profile who made the search query, or some combination.

It should be appreciated that while recommendation engine 442 is described as a model of the application software system 430, other models can be included as models of the application software system 430.

In some implementations, a front-end portion of application software system 430 can operate in user system 410, for example as a plugin or widget in a graphical user interface of a web application, mobile software application, or as a web browser executing user interface 412. In an embodiment, a mobile app or a web browser of a user system 410 can transmit a network communication such as an HTTP request over network 422 in response to user input that is received through a user interface provided by the web application, mobile app, or web browser, such as user interface 412. A server running application software system 430 can receive the input from the web application, mobile app, or browser executing user interface 412, perform at least one operation using the input, and return output to the user interface 412 using a network communication such as an HTTP response, which the web application, mobile app, or browser receives and processes at the user system 410.

In the example of FIG. 4, application software system 430 includes one or more ML models 444. The ML model 444 is configured to receive features (or a vector based on the features) obtained from the features store 454. The ML model 444 generates an embedding using the features (or the vector). The embedding generated by the ML model 444 represents an update (or creation) of an embedding corresponding to the digital content identifier, entity identifier, or user identifier included in an online trigger event. In some embodiments, the ML model 444 is a GNN. The embedding generated by the GNN maps a node of a graph to an embedding space, where embeddings that are similar to each other (by virtue of similar neighbor nodes, similar features, etc.) are positioned closer together in the embedding space. The generated embedding represents a numerical representation of the relationships between nodes in a graph, as opposed to the graphical representation of nodes in the graph.

Event logging service 470 captures and records interaction data generated during operation of application software system 430, including capturing and recording user interface events generated at user systems 410 via user interface 412, in real time. The event logging service 470 formulates the user interface events into a data stream that can be consumed by, for example, a stream processing system. The data stream includes a record of real-time interaction data for each user interface event that has occurred. Interaction data captured by the event logging service 470 includes profile views, profile loads, search requests, clicks on messages or graphical user interface control elements, the creation, editing, sending, and viewing of messages, and social action data such as likes, shares, comments, and social reactions (e.g., "insightful," "curious," etc.). For instance, when a user of application software system 430 via a user system 410 clicks on a user interface element, such as a message, a link, or a user interface control element such as a view, comment, share, or reaction button, or uploads a file, or creates a message, loads a web page, or scrolls through a feed, etc., event logging service 470 fires an event to capture an identifier, such as a session identifier, a user identifier, an event type, a date/timestamp at which the user interface event occurred, and possibly other information about the user interface event, such as the impression portal and/or the impression channel involved in the user interface event. Examples of impression portals and channels include, for example, device types, operating systems, and software platforms, e.g., web or mobile.

In some embodiments, the event logging service 470 monitors interaction data and/or the captured data stream and triggers the deconstruction manager 450 responsive to identifying an online trigger event. As described herein, an online trigger event is an event that changes one or more aspects of the graph of the application software system 430. An online trigger event includes an event that would create or update a node of the graph. For example, an online trigger event can include a user creating a job posting and uploading the job posting to the application software system 430. An online trigger event 162 also includes events that would create or update an edge in the graph. For example, a user can interact with a digital content item (by clicking on the digital content item). The interaction with the digital content item represents the creation of an edge in the graph. Responsive to identifying the online trigger event, the interaction data captured by the event logging service 470 is synthesized by the deconstruction manager 450 such that updates to the graph are translated to updates in a key-value database (e.g., edge store 452).

The deconstruction manager 450 translates the graph of the application software system 430 (described, for example, in FIG. 2) into a data structure that can be stored in a database. In operation, the deconstruction manager 450 deconstructs information of a graph by creating key-value pairs stored in a key-value database. As a result, the deconstruction manager 450 configures and maintains graph information using a database management approach. In operation, the deconstruction manager 450 organizes the edge store 452 such that connections between nodes of a graph are stored as key-value pairs. For example, a source node can be paired with lists of one or more neighboring nodes according to an edge type.

Data storage system 440 includes data stores and/or data services that store digital data received, used, manipulated, and produced by application software system 430 digital content items, entity information (e.g., user profile information, company profile information), key-value pairs (such as those stored in the edge store 452), features (such as those stored in feature store 454), and embeddings, (such as those stored in embedding store 456).

In some embodiments, data storage system 440 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine. Data stores of data storage system 440 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

In the example of FIG. 4, data storage system 440 includes an edge store 452. As described herein, the edge store 452 is a key-value database. A key-value database, or key-value store, is a nonrelational database (NoSQL database) or relational database (SQL) that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. In non-relational databases such as key-value databases, data is stored according to attributes (e.g., values) of data (e.g., keys). Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

As described herein, the edge store 452 stores key-value pairs. The key of the key-value pair is a source node of the deconstructed graph obtained from the online trigger event. The value of the key-value pair includes a list of each neighboring node connected to the source node.

In the example of FIG. 4, data storage system 440 includes a feature store 454. The feature store 454 can be any one or more databases that store information associated with a key or a value of the edge store 452. The data store system 440 also includes an embedding store 456. The embedding store 456 can be any database that stores embeddings. The embeddings represent nodes in a graph (such as the graph described in FIG. 2), generated using the key-value pairs of the edge store 452. Accordingly, the embeddings of the embedding store 456 are numerical representations of the relationships between nodes of the graph.

Data storage system 440 resides on at least one persistent and/or volatile storage device that can reside within the same local network as at least one other device of computing system 400 and/or in a network that is remote relative to at least one other device of computing system 400. Thus, although depicted as being included in computing system 400, portions of data storage system 440 can be part of computing system 400 or accessed by computing system 400 over a network, such as network 422.

While not specifically shown, it should be understood that any of user system 410, application software system 430, deconstruction manager 450, data storage system 440, and event logging service 402 includes an interface embodied as computer programming code stored in computer memory that when executed causes a computing device to enable bidirectional communication with any other of user system 410, application software system 430, deconstruction manager 450, data storage system 440, and event logging service 402 using a communicative coupling mechanism. Examples of communicative coupling mechanisms include network interfaces, inter-process communication (IPC) interfaces and application program interfaces (APIs).

Each of user system 410, application software system 430, deconstruction manager 450, data storage system 440, and event logging service 402 is implemented using at least one computing device that is communicatively coupled to electronic communications network 422. Any of user system 410, application software system 430, deconstruction manager 450, data storage system 440, and event logging service 402 can be bidirectionally communicatively coupled by network 422. User system 410 as well as other different user systems (not shown) can be bidirectionally communicatively coupled to application software system 430.

Terms such as component, module, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 410, application software system 430, deconstruction manager 450, data storage system 440, and event logging service 402 are implemented using computer software, hardware, or software and hardware, and can include combinations of automated functionality, data structures, and digital data, which are represented schematically in the figures. User system 410, application software system 430, deconstruction manager 450, data storage system 440, and event logging service 402 are shown as separate elements in FIG. 4 for ease of discussion but, except as otherwise described, the illustration is not meant to imply that separation of these elements is required. The illustrated systems, services, and data stores (or their functionality) of each of user system 410, application software system 430, deconstruction manager 450, data storage system 440, and event logging service 402 can be divided over any number of physical systems, including a single physical computer system, and can communicate with each other in any appropriate manner.

Figure 5:
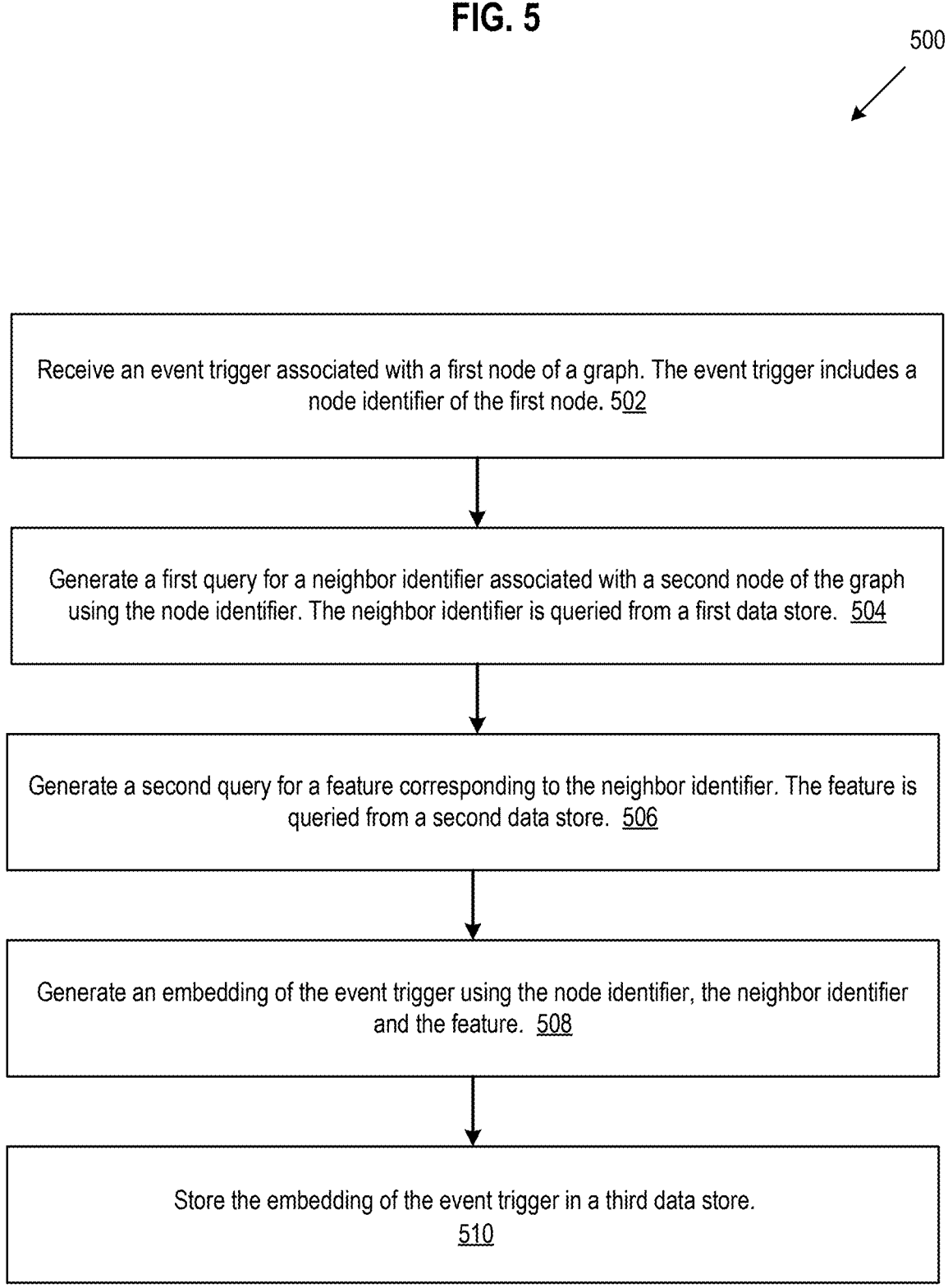
FIG. 5 is a flow diagram of an example method for deconstructions graphs using a database management approach, in accordance with some embodiments of the present disclosure.

FIG. 5 is a flow diagram of an example method for deconstructions graphs using a database management approach, in accordance with some embodiments of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, one or more portions of method 500 is performed by one or more components of the deconstruction manager 150 of FIG. 1 or the deconstruction manager 450 of FIG. 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 502, a processing device receives an event trigger associated with a first node of a graph, the event trigger including a node identifier of the first node. A graph is a way to represent a relationship of entities using nodes and edges. Nodes of the graph represent users (e.g., user profiles), organizations (e.g., companies, schools, institutions), content items (e.g., job postings, announcements, articles, comments, and shares), skills, titles, or other topics and/or objects. Edges of the graph represent relationships between or among nodes of the graph. For example, if a node (e.g., a user) views and accepts a message from another user, an edge of the graph would be created to represent the connection between the message-receiving user entity with the message-sending user entity in the graph, where the edge may be tagged with a label such as "accepted."

An event trigger is an event that represents a user interaction having the effect of updating a node or edge of the graph. For example, an event trigger event can include a user creating a job posting and uploading the job posting to an application software service. Such an event trigger is representative of a node being added or updated in a graph. Additionally or alternatively, an event trigger can include a user interacting with a digital content item (by clicking on the digital content item). The interaction with the digital content item represents the creation of an edge in the graph. The first node of the graph associated with the event trigger is the node associated with the update (e.g., the source node, where the source node is identified using a node identifier). In some implementations, the first data store is a key-value database. The node identifier and the neighbor identifier is a key-value pair of the key-value database.

At operation 504, the processing device generates a first query for a neighbor identifier associated with a second node of the graph using the node identifier. The neighbor identifier is queried from a first data store, which can be the key-value database. The first query for the neighbor identifier represents a query to a key-value database using a key to obtain a value. To obtain the value (a neighbor node of the source node represented by a neighbor identifier), the key includes two components including the node identifier and an edge type of a subset of edge types associated with the node identifier. As described with reference to FIG. 2, each node has a predetermined number of possible edge types. The edge types of the predetermined number of edge types include the subset of edge types. In some implementations, the first query is a query of a number of queries to the first data store. For example, the key-value store is queried for neighboring nodes of the source node a number of times equal to the possible types of neighboring nodes. In other words, the number of queries to the first data store equals a total number of edges associated with the node identifier.

At operation 506, the processing device generates a second query for a feature corresponding to the neighbor identifier. The feature is queried from a second data store. In some implementations, the second data store is a feature data store that includes features of nodes and edges of the graph (deconstructed as key-value pairs in the first data store). As described with reference to FIG. 2, features of nodes and edges stored in the second data store include weight values of nodes, edge counts, or scores determined using the graph.

In some implementations, the first query and the second query are join commands. NoSQL is a language used for data management of key-value databases. Data in key-value databases is stored in arrays, beneficially making the key-value database highly partitionable and able to be scaled. A join command is used to join columns of an array into a new table or array. Sequential join commands are leveraged to query data of the first data store and the second data store to generate a new table or array that includes node information, edge information, and feature information associated with the event trigger.

At operation 508, the processing device generates an embedding of the event trigger using the node identifier, the neighbor identifier, and the feature. In some implementations, the embedding of the event trigger is generated using a graph neural network. For example, as described with reference to FIG. 1, a GNN receives a vector (based on the features of nodes that neighbor the source node and features of the source node) and generates an embedding. The generated embedding maps the source node of the graph to an embedding space, where embeddings that are similar to each other (by virtue of similar neighbor nodes, similar features, etc.) are positioned closer together in the embedding space. The generated embedding represents a numerical representation of the relationships between nodes in a graph, as opposed to the graphical representation of nodes in the graph.

At operation 510, the processing device stores the embedding of the event trigger in a third data store. The third data store is a data store of embeddings that capture node and edge relationships of the graph. In some implementations, the processing device retrieves, from the third data store, the embedding of the event trigger for a model. The model generates a digital content recommendation based on the embedding of the event trigger. For example, as described with reference to FIG. 1, the model can be a recommendation model such as second model 118 that uses embeddings to identify digital content items 122 (such as user profiles, articles, job postings, etc.) responsive to a user search query 120. The digital content items 122 recommended to the user are filtered from a set of all digital content items.

Figure 6:
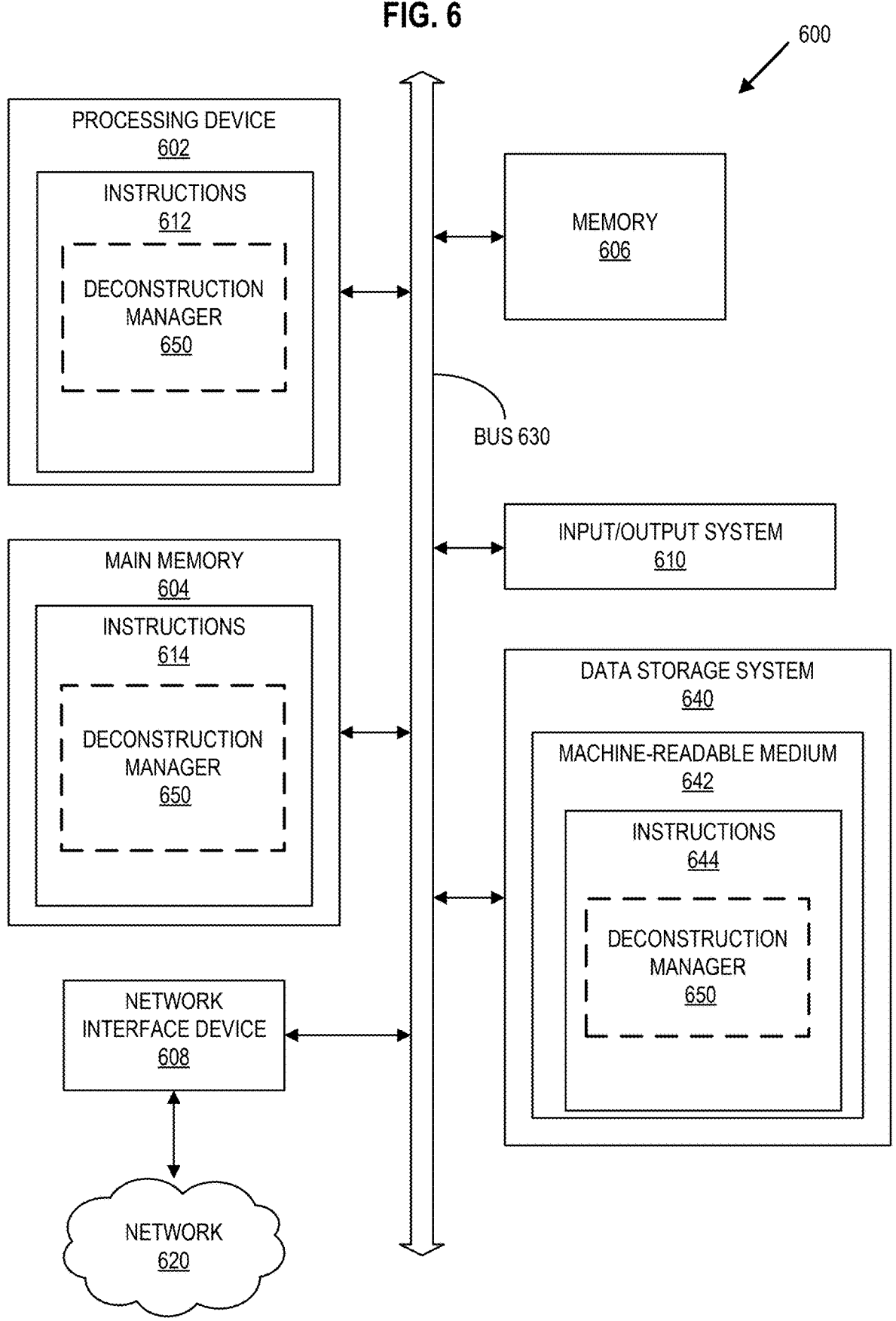
FIG. 6 is a block diagram of an example computer system including components of an application software system, in accordance with some embodiments of the present disclosure.

FIG. 6 is a block diagram of an example computer system including components of an application software system, in accordance with some embodiments of the present disclosure.

In FIG. 6, an example machine of a computer system 600 is shown, within which a set of instructions for causing the machine to perform any of the methodologies discussed herein can be executed. In some embodiments, the computer system 600 can correspond to a component of a networked computer system (e.g., as a component of the application software system 130 of FIG. 1 or the computer system 400 of FIG. 4) that includes, is coupled to, or utilizes a machine to execute an operating system to perform operations corresponding to one or more components of the deconstruction manager 150 of FIG. 1, or the deconstruction manager 450 of FIG. 4. For example, computer system 600 corresponds to a portion of computing system 400 when the computing system is executing a portion of the deconstruction manager 450 of FIG. 4.

The machine is connected (e.g., networked) to other machines in a network, such as a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a memory 603 (e.g., flash memory, static random access memory (SRAM), etc.), an input/output system 610, and a data storage system 640, which communicate with each other via a bus 630.

Processing device 602 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be at least one special-purpose processing device such as an application specific integrated circuit (ASIC), a field programmable gate array (FPGA), a digital signal processor (DSP), network processor, or the like. The processing device 602 is configured to execute instructions 612 for performing the operations and steps discussed herein.

In some embodiments of FIG. 6, deconstruction manager 650 represents portions of deconstruction manager 650 when the computer system 600 is executing those portions of deconstruction manager 650. Instructions 612 include portions of deconstruction manager 650 when those portions of the deconstruction manager 650 are being executed by processing device 602. Thus, the deconstruction manager 650 is shown in dashed lines as part of instructions 612 to illustrate that, at times, portions of the deconstruction manager 650 are executed by processing device 602. For example, when at least some portion of the deconstruction manager 650 is embodied in instructions to cause processing device 602 to perform the method(s) described herein, some of those instructions can be read into processing device 602 (e.g., into an internal cache or other memory) from main memory 604 and/or data storage system 640. However, it is not required that all of the deconstruction manager 650 be included in instructions 612 at the same time and portions of the deconstruction manager 650 are stored in at least one other component of computer system 600 at other times, e.g., when at least one portion of the deconstruction manager 650 is not being executed by processing device 602.

The computer system 600 further includes a network interface device 608 to communicate over the network 620. Network interface device 608 provides a two-way data communication coupling to a network. For example, network interface device 608 can be an integrated-services digital network (ISDN) card, cable modem, satellite modem, or a modem to provide a data communication connection to a corresponding type of telephone line. As another example, network interface device 608 can be a local area network (LAN) card to provide a data communication connection to a compatible LAN. Wireless links can also be implemented. In any such implementation network interface device 608 can send and receive electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 600.

Computer system 600 can send messages and receive data, including program code, through the network(s) and network interface device 608. In the Internet example, a server can transmit a requested code for an application program through the Internet and network interface device 608. The received code can be executed by processing device 602 as it is received, and/or stored in data storage system 640, or other non-volatile storage for later execution.

The input/output system 610 includes an output device, such as a display, for example a liquid crystal display (LCD) or a touchscreen display, for displaying information to a computer user, or a speaker, a haptic device, or another form of output device. The input/output system 610 can include an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information can include voice commands, audio signals, geographic location information, haptic information, and/or digital imagery, for example.

The data storage system 640 includes a machine-readable storage medium 642 (also known as a computer-readable medium) on which is stored at least one set of instructions 644 or software embodying any of the methodologies or functions described herein. The instructions 644 can also reside, completely or at least partially, within the main memory 604 and/or within the processing device 602 during execution thereof by the computer system 600, the main memory 604 and the processing device 602 also constituting machine-readable storage media. In one embodiment, the instructions 644 include instructions to implement functionality corresponding to a deconstruction manager 650 (e.g., the deconstruction manager 150 of FIG. 1 or the deconstruction manager 450 of FIG. 4).

Dashed lines are used in FIG. 6 to indicate that it is not required that the deconstruction manager 650 be embodied entirely in instructions 612, 614, and 644 at the same time. In one example, portions of the deconstruction manager 650 are embodied in instructions 614, which are read into main memory 604 as instructions 614, and portions of instructions 612 are read into processing device 602 as instructions 612 for execution. In another example, some portions of the deconstruction manager 650 are embodied in instructions 644 while other portions are embodied in instructions 614 and still other portions are embodied in instructions 612.

While the machine-readable storage medium 642 is shown in an example embodiment to be a single medium, the term "machine-readable storage medium" should be taken to include a single medium or multiple media that store the instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 6 and the accompanying description, above are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100 or the computing system 400, can carry out the above-described computer-implemented methods in response to its processor executing a computer program (e.g., a sequence of instructions) contained in a memory or other non-transitory machine-readable storage medium (e.g., a non-transitory computer readable medium). Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may choose to share personal data with different platforms to provide services that are more tailored to the users. In instances where the users choose not to share personal data with the platforms, the choices made by the users will not have any impact on their ability to use the services that they had access to prior to making their choice. According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalization tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Illustrative examples of the technologies disclosed herein are provided below. An embodiment of the technologies may include any of the examples described herein, or any combination of any of the examples described herein, or any combination of any portions of the examples described herein.

In some aspects, the techniques described herein relate to a method including: receiving an event trigger associated with a first node of a graph, the event trigger including a node identifier of the first node; generating a first query for a neighbor identifier associated with a second node of the graph using the node identifier, wherein the neighbor identifier is queried from a first data store; generating a second query for a feature corresponding to the neighbor identifier, wherein the feature is queried from a second data store; generating an embedding of the event trigger using the node identifier, the neighbor identifier and the feature; and storing the embedding of the event trigger in a third data store.

In some aspects, the techniques described herein relate to a method, wherein the first data store is a key-value database, and wherein the node identifier and the neighbor identifier includes a key-value pair of the key-value database.

In some aspects, the techniques described herein relate to a method, further including: retrieving, from the third data store, the embedding of the event trigger for a model, wherein the model generates a digital content recommendation based on the embedding of the event trigger.

In some aspects, the techniques described herein relate to a method, wherein the first query and the second query are join commands.

In some aspects, the techniques described herein relate to a method, wherein the first query is a query of a number of queries to the first data store, and wherein the number of queries to the first data store equals a total number of edges associated with the node identifier In some aspects, the techniques described herein relate to a method, wherein the total number of edges associated with the node identifier includes a subset of edge types, and wherein the first query further includes an edge type of the subset of edge types.

In some aspects, the techniques described herein relate to a method, wherein the embedding of the event trigger is generated using a graph neural network.

In some aspects, the techniques described herein relate to a system including: at least one processor; and at least one memory device coupled to the at least one processor, wherein the at least one memory device includes instructions that, when executed by the at least one processor, cause the at least one processor to perform at least one operation including: receive an event trigger associated with a first node of a graph, the event trigger including a node identifier of the first node; generate a first query for a neighbor identifier associated with a second node of the graph using the node identifier, wherein the neighbor identifier is queried from a first data store; generate a second query for a feature corresponding to the neighbor identifier, wherein the feature is queried from a second data store; generate an embedding of the event trigger using the node identifier, the neighbor identifier and the feature; and store the embedding of the event trigger in a third data store.

In some aspects, the techniques described herein relate to a system, wherein the first data store is a key-value database, and wherein the node identifier and the neighbor identifier includes a key-value pair of the key-value database.

In some aspects, the techniques described herein relate to a system, further includes instructions that, when executed by the at least one processor, cause the at least one processor to perform at least one operation including: retrieve, from the third data store, the embedding of the event trigger for a model, wherein the model generates a digital content recommendation based on the embedding of the event trigger.

In some aspects, the techniques described herein relate to a system, wherein the first query and the second query are join commands.

In some aspects, the techniques described herein relate to a system, wherein the first query is a query of a number of queries to the first data store, and wherein the number of queries to the first data store equals a total number of edges associated with the node identifier In some aspects, the techniques described herein relate to a system, wherein the total number of edges associated with the node identifier includes a subset of edge types, and wherein the first query further includes an edge type of the subset of edge types.

In some aspects, the techniques described herein relate to a system, wherein the embedding of the event trigger is generated using a graph neural network.

In some aspects, the techniques described herein relate to a non-transitory computer-readable medium including instructions that, when executed by at least one processor, cause the at least one processor to perform at least one operation including: receive an event trigger associated with a first node of a graph, the event trigger including a node identifier of the first node; generate a first query for a neighbor identifier associated with a second node of the graph using the node identifier, wherein the neighbor identifier is queried from a first data store; generate a second query for a feature corresponding to the neighbor identifier, wherein the feature is queried from a second data store; generate an embedding of the event trigger using the node identifier, the neighbor identifier and the feature; and store the embedding of the event trigger in a third data store.

In some aspects, the techniques described herein relate to a non-transitory computer-readable medium, wherein the first data store is a key-value database, and wherein the node identifier and the neighbor identifier includes a key-value pair of the key-value database.

In some aspects, the techniques described herein relate to a non-transitory computer-readable medium, further including instructions that, when executed by at least one processor, cause the at least one processor to perform at least one operation including: retrieve, from the third data store, the embedding of the event trigger for a model, wherein the model generates a digital content recommendation based on the embedding of the event trigger.

In some aspects, the techniques described herein relate to a non-transitory computer-readable medium, wherein the first query and the second query are join commands.

In some aspects, the techniques described herein relate to a non-transitory computer-readable medium, wherein the first query is a query of a number of queries to the first data store, and wherein the number of queries to the first data store equals a total number of edges associated with the node identifier In some aspects, the techniques described herein relate to a non-transitory computer-readable medium, wherein the total number of edges associated with the node identifier includes a subset of edge types, and wherein the first query further includes an edge type of the subset of edge types.

Clause 1. A method comprising: receiving an event trigger associated with a first node of a graph, the event trigger including a node identifier of the first node; generating a first query for a neighbor identifier associated with a second node of the graph using the node identifier, wherein the neighbor identifier is queried from a first data store; generating a second query for a feature corresponding to the neighbor identifier, wherein the feature is queried from a second data store; generating an embedding of the event trigger using the node identifier, the neighbor identifier and the feature; and storing the embedding of the event trigger in a third data store.

Clause 2. The method of clause 1, wherein the first data store is a key-value database, and wherein the node identifier and the neighbor identifier comprises a key-value pair of the key-value database.

Clause 3. The method of clause 1 or clause 2, further comprising: retrieving, from the third data store, the embedding of the event trigger for a model, wherein the model generates a digital content recommendation based on the embedding of the event trigger.

Clause 4. The method of clause 1, wherein the first query and the second query are join commands.

Clause 5. The method of any of clauses 1-4, wherein the first query is a query of a number of queries to the first data store, and wherein the number of queries to the first data store equals a total number of edges associated with the node identifier Clause 6. The method of any of clauses 1-5, wherein the total number of edges associated with the node identifier comprises a subset of edge types, and wherein the first query further comprises an edge type of the subset of edge types.

Clause 7. The method of any of clauses 1-6, wherein the embedding of the event trigger is generated using a graph neural network.

Clause 8. A system comprising: at least one processor; and at least one memory device coupled to the at least one processor, wherein the at least one memory device comprises instructions that, when executed by the at least one processor, cause the at least one processor to perform at least one operation comprising: receive an event trigger associated with a first node of a graph, the event trigger including a node identifier of the first node; generate a first query for a neighbor identifier associated with a second node of the graph using the node identifier, wherein the neighbor identifier is queried from a first data store; generate a second query for a feature corresponding to the neighbor identifier, wherein the feature is queried from a second data store; generate an embedding of the event trigger using the node identifier, the neighbor identifier and the feature; and store the embedding of the event trigger in a third data store.

Clause 9. The system of clause 8, wherein the first data store is a key-value database, and wherein the node identifier and the neighbor identifier comprises a key-value pair of the key-value database.

Clause 10. The system of clause 8 or clause 9, further comprises instructions that, when executed by the at least one processor, cause the at least one processor to perform at least one operation comprising: retrieve, from the third data store, the embedding of the event trigger for a model, wherein the model generates a digital content recommendation based on the embedding of the event trigger.

Clause 11. The system of any clauses 8-10, wherein the first query and the second query are join commands.

Clause 12. The system of any clauses 8-111, wherein the first query is a query of a number of queries to the first data store, and wherein the number of queries to the first data store equals a total number of edges associated with the node identifier Clause 13. The system of any clauses 8-12, wherein the total number of edges associated with the node identifier comprises a subset of edge types, and wherein the first query further comprises an edge type of the subset of edge types.

Clause 14. The system of any clauses 8-13, wherein the embedding of the event trigger is generated using a graph neural network.

Clause 15. A non-transitory computer-readable medium comprising instructions that, when executed by at least one processor, cause the at least one processor to perform at least one operation comprising: receive an event trigger associated with a first node of a graph, the event trigger including a node identifier of the first node; generate a first query for a neighbor identifier associated with a second node of the graph using the node identifier, wherein the neighbor identifier is queried from a first data store; generate a second query for a feature corresponding to the neighbor identifier, wherein the feature is queried from a second data store; generate an embedding of the event trigger using the node identifier, the neighbor identifier and the feature; and store the embedding of the event trigger in a third data store.

Clause 16. The non-transitory computer-readable medium of clause 15, wherein the first data store is a key-value database, and wherein the node identifier and the neighbor identifier comprises a key-value pair of the key-value database.

Clause 17. The non-transitory computer-readable medium of clause 15 or clause 16, further comprising instructions that, when executed by at least one processor, cause the at least one processor to perform at least one operation comprising: retrieve, from the third data store, the embedding of the event trigger for a model, wherein the model generates a digital content recommendation based on the embedding of the event trigger.

Clause 18. The non-transitory computer-readable medium of any clauses 15-17, wherein the first query and the second query are join commands.

Clause 19. The non-transitory computer-readable medium of any clauses 15-18, wherein the first query is a query of a number of queries to the first data store, and wherein the number of queries to the first data store equals a total number of edges associated with the node identifier Clause 20. The non-transitory computer-readable medium of any clauses 15-19, wherein the total number of edges associated with the node identifier comprises a subset of edge types, and wherein the first query further comprises an edge type of the subset of edge types.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:
   receiving an event trigger associated with a first node of a graph, the event trigger including a node identifier of the first node;
   generating a first query for a neighbor identifier associated with a second node of the graph using the node identifier, wherein the neighbor identifier is queried from a first data store;
   generating a second query for a feature corresponding to the neighbor identifier, wherein the feature is queried from a second data store;
   generating an embedding of the event trigger using the node identifier, the neighbor identifier and the feature; and
   storing the embedding of the event trigger in a third data store.

2. The method of claim 1, wherein the first data store is a key-value database, and wherein the node identifier and the neighbor identifier comprises a key-value pair of the key-value database.

3. The method of claim 1, further comprising:
   retrieving, from the third data store, the embedding of the event trigger for a model, wherein the model generates a digital content recommendation based on the embedding of the event trigger.

4. The method of claim 1, wherein the first query and the second query are join commands.

5. The method of claim 1, wherein the first query is a query of a number of queries to the first data store, and wherein the number of queries to the first data store equals a total number of edges associated with the node identifier.

6. The method of claim 5, wherein the total number of edges associated with the node identifier comprises a subset of edge types, and wherein the first query further comprises an edge type of the subset of edge types.

7. The method of claim 1, wherein the embedding of the event trigger is generated using a graph neural network.

8. A system comprising:
   at least one processor; and
   at least one memory device coupled to the at least one processor, wherein the at least one memory device comprises instructions that, when executed by the at least one processor, cause the at least one processor to perform at least one operation comprising:
   receive an event trigger associated with a first node of a graph, the event trigger including a node identifier of the first node;
   generate a first query for a neighbor identifier associated with a second node of the graph using the node identifier, wherein the neighbor identifier is queried from a first data store;
   generate a second query for a feature corresponding to the neighbor identifier, wherein the feature is queried from a second data store;
   generate an embedding of the event trigger using the node identifier, the neighbor identifier and the feature; and
   store the embedding of the event trigger in a third data store.

9. The system of claim 8, wherein the first data store is a key-value database, and wherein the node identifier and the neighbor identifier comprises a key-value pair of the key-value database.

10. The system of claim 8, further comprises instructions that, when executed by the at least one processor, cause the at least one processor to perform at least one operation comprising:
    retrieve, from the third data store, the embedding of the event trigger for a model, wherein the model generates a digital content recommendation based on the embedding of the event trigger.

11. The system of claim 8, wherein the first query and the second query are join commands.

12. The system of claim 8, wherein the first query is a query of a number of queries to the first data store, and wherein the number of queries to the first data store equals a total number of edges associated with the node identifier.

13. The system of claim 12, wherein the total number of edges associated with the node identifier comprises a subset of edge types, and wherein the first query further comprises an edge type of the subset of edge types.

14. The system of claim 8, wherein the embedding of the event trigger is generated using a graph neural network.

15. A non-transitory computer-readable medium comprising instructions that, when executed by at least one processor, cause the at least one processor to perform at least one operation comprising:

receive an event trigger associated with a first node of a graph, the event trigger including a node identifier of the first node;

generate a first query for a neighbor identifier associated with a second node of the graph using the node identifier, wherein the neighbor identifier is queried from a first data store;

generate a second query for a feature corresponding to the neighbor identifier, wherein the feature is queried from a second data store;

generate an embedding of the event trigger using the node identifier, the neighbor identifier and the feature; and store the embedding of the event trigger in a third data store.

16. The non-transitory computer-readable medium of claim 15, wherein the first data store is a key-value database, and wherein the node identifier and the neighbor identifier comprises a key-value pair of the key-value database.

17. The non-transitory computer-readable medium of claim 15, further comprising instructions that, when executed by at least one processor, cause the at least one processor to perform at least one operation comprising:

retrieve, from the third data store, the embedding of the event trigger for a model, wherein the model generates a digital content recommendation based on the embedding of the event trigger.

18. The non-transitory computer-readable medium of claim 15, wherein the first query and the second query are join commands.

19. The non-transitory computer-readable medium of claim 15, wherein the first query is a query of a number of queries to the first data store, and wherein the number of queries to the first data store equals a total number of edges associated with the node identifier.

20. The non-transitory computer-readable medium of claim 19, wherein the total number of edges associated with the node identifier comprises a subset of edge types, and wherein the first query further comprises an edge type of the subset of edge types.

* * * * *